(12) United States Patent
Grade et al.

(10) Patent No.: US 6,858,573 B1
(45) Date of Patent: Feb. 22, 2005

(54) ANIONIC SURFACTANTS

(75) Inventors: Johny Denis Grade, Meldert (BE); Trevor Blease, Stockton on Tees (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/625,910

(22) Filed: Jul. 24, 2003

Related U.S. Application Data

(63) Continuation of application No. PCT/GB02/00133, filed on Jan. 14, 2002.

(30) Foreign Application Priority Data

Jan. 24, 2001 (GB) .............................................. 0101771

(51) Int. Cl.⁷ .............................. C11D 1/02; C08K 5/36
(52) U.S. Cl. ........................ 510/535; 510/361; 510/426; 510/475; 510/494; 524/713; 524/745; 524/760; 524/776
(58) Field of Search ................................ 510/361, 426, 510/475, 494, 535; 524/713, 745, 760, 776

(56) References Cited

FOREIGN PATENT DOCUMENTS

| | | | |
|---|---|---|---|
| EP | 0389157 | 9/1990 | |
| EP | WO 94/00508 | * 1/1994 | ........... C08G/65/32 |
| FR | 1360710 | 4/1964 | |
| GB | 2111484 | 7/1983 | |
| JP | 6312334 | 1/1988 | |
| WO | WO 94/00508 | 1/1994 | |
| WO | WO 95/06070 | 3/1995 | |
| WO | WO 99/32522 | 7/1999 | |
| WO | WO 01/05224 | 1/2001 | |
| WO | WO 01/26791 | 4/2001 | |

* cited by examiner

Primary Examiner—Brian P. Mruk
(74) Attorney, Agent, or Firm—Mayer Brown Rowe & Maw LLP

(57) ABSTRACT

An anionic surfactant of the formula (I): $R^2$—Y—(O)C—(HR)C—C(HR$^1$)—C(O)—(OA)$_n$—X wherein one of R and $R^1$ is a $C_6$ to $C_{22}$ linear or branched alkyl or alkenyl, and the other is hydrogen; Y is O, or NH, or —NH—CH$_2$—C(=CH$_2$)—, or —N(CH$_2$—CR$^3$(=CH$_2$))—CH$_2$—C(=CH$_2$)— where $R^3$ is hydrogen or methyl; when Y is O, $R^2$ is hydrogen, or a salt, or a $C_1$ to $C_6$ linear or branched alkyl, or an optionally substituted $C_3$ to $C_{10}$ linear or branched alkenyl; when Y is NH, or —NH—CH$_2$—C(=CH$_2$)—, or —N(CH$_2$—CR$^3$(=CH$_2$))—CH$_2$—C(=CH$_2$)— where $R^3$ is hydrogen or methyl, $R^2$ is hydrogen or methyl; OA is an oxyalkylene group; n is 2 to 100; and X is a group comprising at least one acidic H atom, or a salt thereof, and the use thereof in free radical initiated addition polymerisation, particularly emulsion polymerisation.

11 Claims, No Drawings

ANIONIC SURFACTANTS

CROSS REFERENCE TO RELATED APPLICATION

This application is a continuation application based on International Application No. PCT/GB02/001233, filed Jan. 14, 2002, which designates the United States. This is incorporated herein by reference.

FIELD OF INVENTION

The present invention relates to certain anionic alkoxylated surfactants, free radical initiated addition polymerisation of unsaturated monomers in the presence of such surfactants including, in particular, emulsion polymerisation methods using such surfactants.

INTRODUCTION

Anionic surfactants have been known for many years and used in many industrial applications. WO 99/32522-A describes anionic alkoxylated surfactants having a hydrophobe which is a hydrocarbyl group containing from 16 to 22 carbon atoms and at least 2 double bonds, preferably being derived from linoleyl alcohol. WO 99/32522-A discloses the use of such surfactants in emulsion polymerisation, which are believed to be covalently grafted onto the resultant product polymer, resulting in improved water resistance and reduced water absorption than conventional polymers produced by emulsion polymerisation. Unfortunately, linoleyl alcohol is of limited availability, can be expensive, and there is a commercial need to further improve the particle size, and to improve the water resistance and to reduce the water absorption of polymer latices produced by emulsion polymerisation methods, and to improve the colloidal stability of such emulsions.

SUMMARY OF THE INVENTION

We have now surprisingly discovered a group of novel anionic alkoxylated surfactants, based upon substituted succinic acid, which overcome pr significantly reduce at least one of the aforementioned problems.

Accordingly, the present invention provides an anionic surfactant of the formula (I):

$$R^2—Y—(O)C—(HR)C—C(HR^1)—C—(O(OA)_n—X \qquad (I)$$

wherein one of R and $R^1$ is a $C_6$ to $C_{22}$ linear or branched alkyl or alkenyl, and the other is hydrogen;
Y is O, or NH, or —NH—$CH_2$—C(=$CH_2$)—, or —N($CH_2$—$CR^3$(=$CH_2$))—$CH_2$—C(=$CH_2$) where $R^3$ is hydrogen or methyl;
when Y is O, $R^2$ is hydrogen, or a salt, or a $C_1$ to $C_6$ linear or branched alkyl, or an optionally substituted $C_3$ to $C_{10}$ linear or branched alkenyl;
when Y is NH, or —NH—$CH_2$—C(=$CH_2$)—, or —N($CH_2$—$CR^3$(=$CH_2$))—$CH_2$ C(=$CH_2$)— where $R^3$ is hydrogen or methyl, $R^2$ is hydrogen or methyl;
OA is an oxyalkylene group;
n is 2 to 100; and
X is a group comprising at least one acidic H atom, or a salt thereof.

The invention further provides a method of free radical initiated addition polymerisation of at least one ethylenically unsaturated monomer in the presence of a surfactant comprising at least one anionic surfactant of the formula (I):

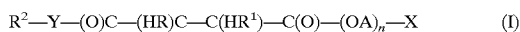

wherein one of R and $R^1$ is a $C_6$ to $C_{22}$ linear or branched alkyl or alkenyl, and the other is hydrogen;
Y is O, or NH, or —NH—$CH_2$—C(=$CH_2$)—, or —N($CH_2$—$CR^3$(=$CH_2$))—$CH_2$-C(=$CH_2$)— where $R^3$ is hydrogen or methyl;
when Y is O, $R^2$ is hydrogen, or a salt, or a $C_1$ to $C_6$ linear or branched alkyl, or an optionally substituted $C_3$ to $C_{10}$ linear or branched alkenyl;
when Y is NH, or —NH—$CH_2$—C(=$CH_2$)—, or —N($CH_2$—$CR^3$(=$CH_2$))—$CH_2$—C(=$CH_2$)— where $R^3$ is hydrogen or methyl, $R^2$ is hydrogen or methyl;
OA is an oxyalkylene group;
n is 2 to 100; and
X is a group comprising at least one acidic H atom, or a salt thereof.

The invention also provides the use of an anionic surfactant of the formula (I):

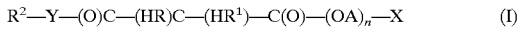

wherein one of R and $R^1$ is a $C_6$ to $C_{22}$ linear or branched alkyl or alkenyl, and the other is hydrogen;
Y is O, or NH, or —NH—$CH_2$—C(=$CH_2$)—, or —N($CH_2$—$CR^3$(=$CH_2$))—$CH_2$—C(=$CH_2$)— where $R^3$ is hydrogen or methyl;
when Y is O, $R^2$ is hydrogen, or a salt, or a $C_1$ to $C_6$ linear or branched alkyl, or an optionally substituted $C_3$ to $C_{10}$ linear or branched alkenyl;
when Y is NH, or —NH—$CH_2$—C(=$CH_2$)—, or —N($CH_2$—$CR^3$(=$CH_2$))—$CH_2$—C(=$CH_2$)— where $R^3$ is hydrogen or methyl, $R^2$ is hydrogen or methyl;
OA is an oxyalkylene group;
n is 2 to 100; and
X is a group comprising at least one acidic H atom, or a salt thereof, as a non-migratory surfactant in emulsion polymerisation.

The anionic surfactant is preferably covalently bonded onto the resultant polymer produced according to the method or use of the present invention. Preferably at least 10%, more preferably in the range from 30% to 99%, particularly 50% to 95%, and especially 60% to 90% by weight of the anionic surfactant is covalently bonded onto the polymer.

The group R or $R^1$ which is not hydrogen is suitably a $C_8$ to $C_{22}$, preferably a $C_{10}$ to $C_{22}$, more preferably a $C_{12}$ to $C_{20}$, particularly a $C_{14}$ to $C_{18}$ alkenyl or alkyl, and especially alkenyl, group. The alkenyl group preferably comprises a single double bond. It is preferred that the R or $R^1$ alkyl or alkenyl group has a linear chain. When the chain is not linear it preferably has at the most a total of two, and more preferably not more than one branch on average.

When the group $R^2$ is a salt, it can be a metal, eg alkali metal, such as Li, K or Na, particularly Na, ammonium, including amine or hydroxy-substituted amine e.g. alkanolamine, onium, or amine, particularly alkylamine, especially tertiary alkylamine and hydroxy-substituted amine e.g. alkanolamine, especially tertiary alkanolamine such as triethanolamine. The salt can be made by direct reaction of a carboxy end group with an appropriate base.

When the group $R^2$ is a $C_1$ to $C_6$ alkyl, it is preferably a methyl, ethyl propyl or butyl group, more preferably a methyl group.

When the group $R^2$ is an optionally substituted $C_3$ to $C_{10}$ alkenyl, it preferably comprises a single double bond, and more preferably is a group of formula —$CH_2$—C(=$CH_2$)—$R^4$ where $R^4$ is hydrogen or methyl; or a group of formula —$R^5$—O—C(O)—C(=$CH_2$)—$R^6$ where $R^5$ is a $C_2$ to $C_6$ linear or branched alkyl, and $R^6$ is hydrogen or methyl. Such $R^2$ groups may be derived from unsaturated alcohols such as allyl alcohol, methallyl alcohol, 2-hydroxyethyl (meth) acrylate, 2-hydroxypropyl (methacrylate, 3-hydroxypropyl (meth)acrylate, 2-hydroxybutyl (meth)acrylate, 3-hydroxybutyl (meth)acrylate, 4-hydroxybutyl (meth) acrylate, and 4-hydroxypentyl (meth)acrylate.

When $YR^2$ is $-NH-CH_2-C(=CH_2)-R^2$, or $-N(CH_2-CR^3(=CH_2)-CH_2-C(=CH_2)R^2$ where $R^2$ and $R^3$ are independently hydrogen or methyl, it may be derived from unsaturated amines such as allylamine, methallylamine and diallylamine.

The oxyalkylene group OA is preferably a group of the formula: $-(OC_mH_{2m})-$ where m is preferably 2, 3 or 4, and more preferably 2 or 3, i.e. an oxyethylene or oxypropylene group. The polyoxyalkylene chain may be substantially or wholly of oxyethylene residues, or substantially or wholly of oxypropylene residues, or it may include both oxyethylene and oxypropylene residues to give a random or block copolymer chain. The chain is preferably a homopolymeric polyoxyethylene chain.

The value of n is suitably in the range from 2 to 60, preferably 4 to 50, more preferably 5 to 30, particularly 10 to 20, especially where the polyoxyalkylene chain is substantially or wholly a polyoxyethylene chain. Where the chain is a block or random copolymer of oxyethylene and oxypropylene residues the chain length chosen will typically correspond to the above ranges, but will depend upon the proportion of oxyethylene and oxypropylene residues in the chain. In copolymer chains usually oxyethylene residues will provide at least 50 mole % of the total oxyalkylene residues. Oxybutylene residues can be included in the chain, but when present these will usually be present as a minor component of the chain e.g. up to about 20 mole % of the total polyoxyalkylene chain. Of course, numerical values of numbers of repeat units in the polyoxyalkylene chain are average values, and therefore n does not have to be an integer.

The group X is a group comprising at least one acidic H atom or a salt thereof, by which we mean that the group X can be ionised to form an anionic group in an aqueous medium. In use the group X provides an anionic function making the surfactant an anionic surfactant. The anionic functionality can be provided by a phosphorus acid group, a sulphur acid group or a carboxylic acid group. Suitable phosphorus acid groups include phosphate: $-O-P-(O)(OH)_2$ and monoester phosphate $-O-P-(O)(OR^7)(OH)$, where $R^7$ is an ester forming group, typically a group of the formula $R^2-Y-(O)C-(HR)C-C(HR^1)-C(O)-(OA)_n-$, where R, $R^1$, $R^2$, Y, OA, and n are as defined above for formula (I) and is usually the same as the other group $R^2-Y-(O)C-(HR)C-C(HR^1)-C(O)-(OA)_n-$ defined in formula (I). Sulphur acid groups include sulphate: $-O-S-(O)_2-OH$, sulphonate: $-O-R^8-S-(O)_2-OH$, where $R^8$ is an alkylene group, preferably a $C_1$ to $C_8$, more preferably a $C_2$ to $C_6$, particularly a $C_2$ to $C_4$ alkylene group. Preferred examples of sulphonate groups include $R^8$ being a $-C_2H_4-$ group (giving X as an isethionate: $-O-(CH_2)_2-S-(O)_2-OH$ group), and particularly preferred is when $R^8$ is a $-C_3H_6-$ group (giving X as $-O-(CH_2)_3-SO)_2-OH$ group). Suitable carboxylic acid groups include carboxymethoxy: $-O-CH_2-CO_2H$, maleate: $-O-(O)C-CH=CH-CO_2H$, succinnate: $-O-(O)C-CH_2-CH_2-CO_2H$ and sulphosuccinate $-O-(O)C-[C_2H_3(SO_3H)]-CO_2H$.

In a particularly preferred embodiment of the invention X comprises at least one sulphur atom, preferably comprises a sulphonate group, and more preferably is $-O-R^8-S-(O)_2OH$, where $R^8$ is an alkylene group, preferably a $C_1$ to $C_8$, more preferably a $C_2$ to $C_6$, particularly a $C_2$ to $C_4$, and especially a $-C_3H_6-$ group, or a salt thereof.

The anionic group may be introduced into the molecule by methods generally known in the art, for example by reaction of a compound $R^2-Y-(O)C-(HR)C-C(HR^1)-C(O)-(OA)_n-OH$, where R, $R^1$, $R^2$, Y, OA, and n are as defined above for formula (I), with suitable reactive anionic compounds. For example, compounds where X is phosphate or ester phosphate may be made by reaction of a compound $R^2-Y-(O)C-(HR)C-C(HR^1)-C(O)-(OA)_n-OH$ with polyphosphoric acid, phosphorus pentoxide, oxychloride or trichloride. Sulphates may be made by reacting a compound $R^2-Y-(O)C-(HR)C-C(HR^1)-C(O)-(OA)_n-OH$ with sulphuric acid, and sulphonates by reacting such a compound with an hydroxyalkylenesulphonate e.g isethionic acid. Carbomethoxy end groups may be provided by reaction of the alkoxylated alcohol with α-haloacetic acid under suitable conditions or by controlled oxidation of the terminal ethoxy group in a polyethoxylate. Maleate and succinate end groups may be provided by esterification reactions with the corresponding anhydride and the sulphosuccinate by onward reaction of the maleate ester product with sodium bisulphite.

When X is a sulphonate group, preferably $-O-R^8-S-(O)_2-OH$, where $R^8$ is an alkylene group as defined above, the anionic surfactant according to the present invention is preferably produced by sulphonating an allyl alcohol ethoxylate, more preferably with a bisulphite salt, followed by reaction of the non-sulphonate end group with substituted, preferably alkenyl, succinic anhydride to form an ester. Suitable sulphonation methodology is described in "Sulphonation and Related Reactions"; Gilbert; Elsevier 1965.

The salt forming moiety of X, when present, can be a metal, eg alkali metal, such as Li, K or Na, particularly Na, ammonium, including amine or hydroxy-substituted amine e.g. alkanolamine, onium, or amine, particularly alkylamine, especially tertiary alkylamine and hydroxy-substituted amine e.g. alkanolamine, especially tertiary alkanolamine such as triethanolamine. Salts can generally be made from free acid precursors by direct reaction with an appropriate base.

The anionic surfactants according to the present invention are particularly useful in emulsion polymerisation, especially the oil-in-water emulsion polymerisation of ethylenically unsaturated monomers. In particular, the polymerisation of systems using or comprising vinyl monomers and/or acrylic monomers, particularly in oil-in-water emulsion polymerisation.

The ethylenically unsaturated monomers that can be polymerised include unsaturated carboxylic acids and their alkyl esters, amides, N-substituted amides and nitriles, aromatic vinyl compounds, diene compounds which may be included as monomers or specifically as crosslinking agents, vinylethers, vinylesters, olefines and hydrophobic allyl compounds.

Unsaturated carboxylic acids and their derivatives include acrylic species including alpha alkyl, especially methyl species, such as (meth)acrylic acid and (meth)acrylate esters including alkyl and hydroxyalkyl (meth)acrylates, such as methyl methacrylate and vinyl (meth)acrylate; acrylonitrile and methacrylonitrile; and water insoluble (meth) acrylamides such as acrylamide, N-isopropyl-acrylamide and N-methylol(meth)acrylamide; including cationic and quaternary species; alkanediol (meth)acrylates such as (poly)ethyleneglycol di(meth)acrylates and methoxypolyethyleneglycol (meth)acrylates, urethane acrylates and epoxy acrylates; fumaric acid, maleic acid and anhydride and itaconic acid and their esters, particularly dialkyl maleates, dialkyl fumarates, dialkyl itaconates, amides and imides.

Vinylic species include halides such as vinyl halides, especially vinyl chloride, and vinylidene halides, especially vinylidene chloride, vinyl esters such as vinyl acetate, vinyl propionate and higher linear and branched acid esters such as vinyl versatate, vinyl ethers. Aromatic vinyl compounds include styrene, α-methylstyrene and p-tert-butylstyrene and vinyl pyridines. Other ethylenically unsaturated monomers include olefins particulary α-olefines such as ethylene, propylene and butene and diene compounds include butadiene, isoprene, isobutadiene chloroprene and divinlbenzene.

The polymerisation can be carried out to make homopolymers such as poly(vinyl acetate), polystyrene and poly(methyl methacrylate) or copolymers such as ethylene-vinyl acetate copolymers, acrylic copolymers and styrene/acrylic copolymers, styrene-butadiene rubbers and carboxylated styrene-butadiene rubbers, butadiene-acrylonitrile rubbers and chlorinated polymers such as polychloroprene.

The invention is particularly applicable to the manufacture of vinyl homopolymers or copolymers, for example those where preferably at least 50%, more preferably at least 60%, particularly at least 80%, and especially at least 90% or more up to 100%, by weight of the monomers are vinyl monomers. The comonomers may for example be ester, urethane or epoxy monomers, resulting in the formation of polyvinylester, polyvinylurethane or polyvinylepoxy random, graft or block copolymers.

The amount of surfactant used will depend on the particular monomers and the polymerisation system used, and in emulsion polymerisation on the degree of colloidal stability needed and the desired particle size of the polymer in the product latex. However, for an otherwise conventional water-in-oil emulsion polymerisation, to give a latex having a particle size of from 80 to 500 nm the amount of surfactant used will preferably be in the range from 0.25 to 5, more preferably 0.5 to 2.5, and particularly 1 to 2 parts by weight surfactant per 100 parts by weight total monomer (phm).

In microemulsion polymerisation systems, the concentration of monomer is typically substantially lower than in conventional emulsion or other dispersion polymerisation systems e.g. in the range from 3 to 10% by weight. The proportion of surfactant relative to the amount of monomer is also relatively high because the microemulsion has higher interface area per unit mass of monomer corresponding to the smaller emulsion particle size. Typical surfactant levels are preferably in the range from 10 to 150 phm. Overall the solids content of microemulsion systems are preferably in the range from 15 to 30% by weight of the total emulsion.

The anionic surfactants according to the present invention can also be used in a mini-emulsion process, involving emulsification of the monomers in a continuous phase, followed by initiation of polymerisation in the monomer droplets, using water-soluble or oil-soluble initiators. The amount of anionic surfactant used will preferably be in the range from 0.5 to 5 parts by weight per 100 parts by weight total monomer (phm). The anionic surfactant may be used with hydrophobic compounds such as cetylalcohol, hexadecane, hydroxyfunctional (meth)acrylates, usually described as co-surfactants, or with polymeric hydrophobes to adjust particle size and limit droplet degradation through diffusion.

The anionic surfactants according to the present invention may be used as the sole surfactant in emulsion polymerisation. Mixtures of anionic surfactants of the formula (I) e.g. differing in the nature of the groups R, $R^1$, or $R^2$, the nature and length of the polyoxyalkylene chain or the nature of the anionic group, may be used. In a particular preferred embodiment of the invention a mixture of anionic surfactants of the formula (I) is used in emulsion polymerisation, the mixture preferably comprising (a) at least one anionic surfactant of the formula (I) wherein n is in the range from 2 to 10, preferably 4 to 8, and (b) least one anionic surfactant of the formula (I) wherein n is in the range from 12 to 50, more preferably 15 to 25, preferably present at a weight % ratio of (a):(b) of 10 to 90:90 to 10, more preferably 10 to 50:90 to 50, and particularly 10 to 30:90 to 70. In addition, minor amounts of conventional anionic, cationic or non-ionic surfactants may also be used.

In particular, anionic surfactants of the formula (I) may be used for both the seed stage and the particle growth stage in emulsion polymerisation. Alternatively, anionic surfactants of the formula (I) may be used for only one of the seed stage or the particle growth stage, with one or more conventional emulsion polymerisation surfactants, copolymerisable surfactants or functional monomers, for example polyalkoxylated allylalcohol, polyalkoxylated (meth)acrylamide, sodium vinylsulphonate and similar compounds known in the art, being used for the other stage.

In a particularly preferred embodiment of the present invention, at least one anionic surfactant of the formula (I) is used for the seed stage, and at least one non-ionic surfactant of the formula (II) below is used for the particle growth stage in emulsion polymerisation.

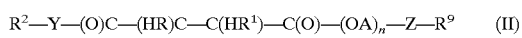

$R^2$—Y—(O)C—(HR)C—C(HR$^1$)—C(O)—(OA)$_n$—Z—$R^9$ (II)

wherein R. $R^1$, $R^2$, Y, OA and n are as defined for the anionic surfactant of formula (I), and Z is O, or NH, or —NH—CH$_2$—C(=CH$_2$)—, or —N(CH$_2$—CR$^{10}$(=CH$_2$))—CH$_2$—C(=CH$_2$)— where $R^{10}$ is hydrogen or methyl;

when Z is O, $R^9$ is hydrogen, or a $C_1$ to $C_6$ linear or branched alkyl, or an optionally substituted $C_3$ to $C_{10}$ linear or branched alkenyl;

when Z is NH, or —NH—CH$_2$—C(=CH$_2$)—, or —N(CH$_2$—CR$^{10}$(=CH$_2$))CH$_2$C(=CH$_2$)— where $R^{10}$ is hydrogen or methyl, $R^9$ is hydrogen or methyl;

When the group $R^9$ is a $C_1$ to $C_6$ alkyl, it is preferably a methyl, ethyl, propyl or butyl group, more preferably a methyl group.

When the group $R^9$ is an optionally substituted $C_3$ to $C_{10}$ alkenyl, it preferably comprises a single double bond, and more preferably is a group of formula —CH$_2$—C(=CH$_2$)—$R^{11}$ where $R^{11}$ is hydrogen or methyl; or a group of formula —$R^{12}$—O—C(O)—C(=CH$_2$)—$R^{13}$ where $R^{12}$ is a $C_2$ to $C_6$ linear or branched alkyl, and $R^{13}$ is hydrogen or methyl. Such $R^9$ groups may be derived from unsaturated alcohols such as allyl alcohol, methallyl alcohol, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and 4-hydroxypentyl (meth)acrylate.

When Z$R^9$ is —NH—CH$_2$—C(=CH$_2$)—$R^9$, or —N(CH$_2$—CR$^3$(=CH$_2$))—CH$_2$—C(=CH$_2$)—$R^9$ where $R^9$ and $R^{10}$ are independently hydrogen or methyl, it may be derived from unsaturated amines such as allylamine, methallylamine and diallylamine.

The polymerisation catalyst used may be any conventional free radical polymerisation initiator for ethylenically unsaturated systems, and in particular for emulsion polymerisation systems. Examples include peroxidic compounds such as inorganic per-compounds e.g. potassium persulphate, and organic per-compounds e.g. tertiary butyl hydroperoxide and other free radical generators such as 2,2'-azobisisobutyronitrile. The proportion of catalyst used will preferably be in the range from 0.001 to 10% by weight, and more preferably 0.01 to 7%, based on the total monomer. When a redox couple is used as the initiator, the proportion of reducing agent is preferably in the range from 0.05 to 100 mole %, more preferably 0.1 to 80%, based on the molar amount of polymerisation initiator.

Other additives in the reaction system can include chain transfer agents, such as alkyl mercaptans and similar acting compounds preferably included at amounts in the range from 0 to 5 phm, more preferably 0.1 to 1 phm; crosslinking agents, such as divinylbenzene or ethylene glycol dimethacrylate, typically used to modify the product polymer molecular weight, preferably included at concentrations in the range from 0 to 5 phm, more preferably 0.1 to 1 phm; water soluble polymers e.g. hydroxyethylcellulose, carboxymethylcellulose, polyethyleneglycol and partially hydrolysed polyvinylacetate, typically used to modify the viscosity of the system, preferably included at concentrations in the range from 0 to 10 phm, more preferably 0.1 to 2 phm; buffers for pH control, sequestering agents, electrolytes and organic solvents in minor amounts preferably totalling in the range from 0 to 5 phm, more preferably 0.1 to 3 phm.

The polymerisation reaction can be carried out using generally conventional procedures preferably at temperatures in the range from ambient temperature to 100° C., more preferably 60 to 100° C., particularly 70 to 95° C., and especially at about 85° C. The anionic surfactants of the formula (I) of the present invention are effective at such elevated temperatures.

The polymerisation method according to the invention, particularly as an emulsion, especially an oil-in-water emulsion, polymerisation, can be carried out over a wide pH range, preferably in the range from 3 to 11, more preferably 4 to 10, but particularly at moderately acid pH e.g. 3 to 6, and especially 4 to 5. After completion of polymerisation, the resultant polymer latices may be neutralised, preferably to a pH in the range from 7 to 10 using organic bases e.g. amines or alkanolamines, or inorganic bases e.g. alkali metal hydroxides or carbonates.

Polymerisation reactions can be carried out in a closed kettle equipped with heating and cooling devices, agitation, thermometer, condenser and inlets for inert gas, monomers and initiator streams. All formulation ingredients can be charged to the reactor from the start in what is known in the art as a batch process. The preferred production process used when working with compounds of the present invention is a semi continuous mode. Part of the ingredients are charged to the reactor, the rest is gradually fed into the reactor in single or multiple feed streams. Monomers are fed as a neat monomer stream, or are mixed into a part of the water with a part of the surfactants and optionally other additives to form a pre-emulsion. Monomer composition can change during the feed stage to control particle morphology.

The latices synthesised using anionic surfactants according to the present invention have lower levels of free surfactant species than products made using conventional surfactants that are not non-migratory. This yields end-products that can have improved resistance to water, higher colloidal stability, show better adhesion to substrates and other advantages related to reduced levels of free surfactant.

The product polymers obtained using anionic surfactants according to the present invention can be used as binders or film formers in interior and exterior architectural coatings, floor coatings, paper and paperboard coatings, coatings for metal protection, waterborne adhesives, inks, binders for non-woven fabrics, concrete and cement additives. Latices can be formulated as such in formulations where water is the carrier, or the polymer can be separated from the aqueous phase by flocculation, spray drying or other known techniques.

The invention is illustrated by the following non-limiting examples.

EXAMPLE 1

Anionic Surfactant Synthesis 448 g allyl alcohol ethoxylated with 18 moles of ethylene oxide was placed in a round bottomed flask fitted with a turbine agitator. To this material were added 225 g demineralised water and 40 g propan-2-ol. The flask was fitted with a compressed air sparge and reflux condenser. The agitator was run at a rate sufficient to give good mixing of the flask contents, and then a solution of 110 g sodium bisulphite in 300 g demineralised water was gradually added from a calibrated dropping funnel to the flask over a period of two hours at a steady rate. No heating was used and the reaction proceeded at ambient temperature, typically between 18 and 22° C. The pH of the reaction mass was monitored every 15 minutes and aliquots of 48% caustic soda solution were added to maintain the pH between 7 and 8. Once the feed of sulphonating agent had been completed, the reaction mass was held at ambient temperature with agitation and the air sparge for a further 7 hours. The reaction mass was filtered to remove precipitated inorganic material before vacuum stripping on a RotoVap to remove all the water. The residues in the RotoVap flask were then heated to reduce the viscosity and refiltered. The degree of conversion was assessed at 98% using $C^{13}$ NMR.

The sulphonated product was further dried in a vacuum oven before 137.4 g were placed in a round bottomed flask fitted with an anchor-type agitator and a nitrogen blanket. 41.8 g of n-dodecenyl succinic anhydride were added to the flask and a reflux condenser was fitted. The agitator was started and contents of the flask were heated to 95° C. over a period of 15 minutes. The temperature was maintained at 95° C. and after a further 5 minutes it was observed that an exotherm peaking at 102° C. had occurred. The temperature was allowed to drop back to 95° C. and maintained for 3 hours 15 minutes. The reaction mass was sampled and examined by infra-red spectroscopy for the disappearance of the characteristic anhydride peak. This peak was not found and the heat was turned off to allow the reaction mass to cool. A final yield of 167 g of sulphonated ethoxylated dodecenyl succinic anhydride product was achieved, the remainder remaining adhered to the flask.

EXAMPLE 2

1) Latex Synthesis

The anionic surfactant produced in Example 1 was evaluated in a seeded semi-continuous vinyl acetate/butyl acrylate (Vac/BA) 85:15 by moles emulsion copolymerisation. No additional colloid or functional monomer was present, and therefore the resultant latex properties are determined by the surfactant used. A phosphated linoleyl alcohol ethoxylate (PLAE) was used as surfactant during the in-situ seed stage. The composition of the latex formulations used is given In Table 1.

TABLE 1

Latex Formulations

| | | Thermal Initiation | Redox Initiation |
|---|---|---|---|
| Initial Reactor Charge | Water | 84.3 | 84.3 |
| | Vac/BA | 12.5 | 12.5 |
| | Potassium persulphate | 0.63 | 0.63 |
| | Potassium carbonate | 0.25 | 0.25 |
| | Water | 15.0 | 15.0 |
| | PLAE Surfactant (20%) | 12.5 | 12.5 |
| Pre-emulsion | Water | 269.0 | 267.8 |
| | Vac/BA | 437.5 | 437.5 |
| | Surfactant produced in Example 1 (80%) | 18.9 | 18.9 |
| | Sodium bisulphate | | 1.20 |
| Initiator solution | Potassium persulphate | 1.80 | 1.80 |
| | Potassium carbonate | 1.80 | 1.80 |
| | Water | 120.0 | 120.0 |
| Mop-up | Water | 10.0 | 10.0 |
| | t-butyl hydroperoxide (70%) | 0.45 | 0.45 |
| | Water | 15.0 | 15.0 |
| | Sodium formaldehyde sulphoxylate | 0.36 | 0.36 |
| Total | | 1000 | 1000 |

(i) Seed Latex Synthesis (Initial Reactor Charge)

Demineralised water was placed in a reactor equipped with anchor stirrer, condenser, and inlets for nitrogen, monomer and initiator streams. The water was purged with nitrogen for 15 minutes. The monomers, buffer and surfactant were added, and the mixture heated to 75° C. while stirring at 150 rpm. The initiator solution was added at a temperature of 65° C., Increased to 75° C., and the reaction allowed to proceed for 15 minutes.

(ii) Pre-Emulsion Preparation

Distilled water was purged with nitrogen for 15 minutes. The buffer and surfactant solution were added, and the mixture was homogenised. The monomer was added to the aqueous phase with stirring. The mixture was homogenised for a further 5 minutes to produce an emulsion.

(iii) Particle Growth Stage

The pre-emulsion and initiator solution were fed concurrently over a period of 4 hours keeping reaction temperature at 75(or 60)° C. The reaction was continued for a further 30 minutes at the same temperature.

(iv) Mop Up

Sodium formaldehyde sulfoxylate solution was added in third portions, and a solution of t-butylhydroperoxide added in half portions every 10 minutes. The reaction was continued for another hour, and then the reaction mixture cooled down to 30° C., filtered and the resultant latex bottled.

that the pre-emulsion stage used a conventional sulphated surfactant having a linear alkyl hydrophobe and ethoxylate hydrophile instead of the surfactant produced in Example 1.

EXAMPLE 5

This is a comparative example, not according to the invention. The procedure of Example 2 was repeated except that the pre-emulsion stage used Synperonic NP 20 (a conventional nonyl phenol ethoxylate) (ex Uniqema) instead of the surfactant produced in Example 1.

EXAMPLE 6

This is a comparative example, not according to the invention. The procedure of Example 5 was repeated except that Na-AMPS (a functional monomer) (ex Lubrisol) was used in the pre-emulsion stage in combination with Synperonic NP 20.

TABLE 2

| | | | | Results | | | | |
|---|---|---|---|---|---|---|---|---|
| | Concentration | Polymerisation Temp. | Latex Particle Size | Transmission Haze (%) | | | Water uptake (%) | |
| Example No. | (phm) | (° C.) | (nm) | 1 hour | 2 hours | 24 hours | 24 hours | 1 week |
| 2 | 3.5 | 75T* | — | 30 | 35 | 39 | 20 | 26 |
| 2 | 3.5 | 60R* | 137 | 10 | 11 | 15 | 10 | 8 |
| 3 (Comparative Ex.) | 3.5 | 75T* | 189 | 61 | 74 | 86 | 34 | 42 |
| 4 (Comparative Ex.) | 3.5 | 60R* | 203 | 15 | | 10 | 15 | 17 |
| 4 (Comparative Ex.) | 3.5 | 75T* | 120 | 95 | | | 136 | 183 |
| 5 (Comparative Ex.) | 3.5 | 75T* | 235 | 66 | 80 | 98 | 46 | 70 |
| 6 (Comparative Ex.) | 3.1/0.4 | 75T* | 148 | 52 | 60 | 86 | 48 | 67 |

*T = thermal initiation and R = redox initiation

2) Particle Size

The volume average particle size of the latex was measured by Photon Correlation Spectroscopy using a Malvern Zetasizer 1000HSA. Results are given in Table 2.

3) Film Preparation and Testing

The latex was applied at a wet film thickness of 200 μm onto a polyester film substrate and dried for 1 week at 23° C., 50% R.H. The film was removed from the substrate and immersed in demineralised water.

Transmission haze of the immersed films was measured after 1, 2 and 24 hours using ASTM method D1003 and expressed as the percentage increase in haze compared to the dry film prior to immersion. This test is a measure of the blooming or whitening of the film. Results are given in Table 2.

Water uptake of the film was measured after 24 hours and 1 week, calculated as the % weight increase compared to the dry film prior to immersion. Results are given in Table 2.

EXAMPLE 3

This is a comparative example, not according to the invention. The procedure of Example 2 was repeated except that the pre-emulsion stage used a nonionic surfactant having an alkenyl succinic anhydride hydrophobe and ethoxylate hydrophile instead of the surfactant produced in Example 1.

EXAMPLE 4

This is a comparative example, not according to the invention. The procedure of Example 2 was repeated except The results show that only the use of the surfactant according to the present invention results in the combination of latex particles of small particle size, and the resultant film having improved water resistance.

What is claimed is:

1. An anionic surfactant of the formula (1):

$$R^2-Y-(O)C-(HR)C-C(HR^1)-C(O)-(OA)_n-X \quad (I)*$$

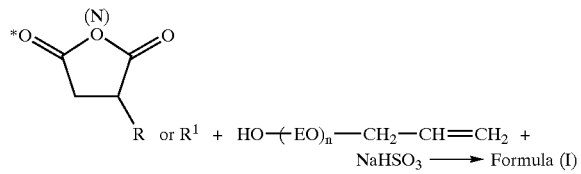

R or $R^1$ + HO—(EO)$_n$—CH$_2$—CH=CH$_2$ + NaHSO$_3$ ⟶ Formula (I)

wherein one of R and $R^1$ is a $C_6$ to $C_{22}$ linear or branched alkyl or alkenyl, and the other is hydrogen;

Y is O, or NH, or —NH—CH$_2$—C(=CH$_2$)—, or —N(CH$_2$—CR$^3$(=CH$_2$))—CH$_2$—C(=CH$_2$)— where $R^3$ is hydrogen or methyl;

when Y is O, $R^2$ is hydrogen, or a salt, or a $C_1$ to $C_6$ linear or branched alkyl, or an optionally substituted $C_3$ to $C_{10}$ linear or branched alkenyl;

when Y is NH, or —NH—CH$_2$—C(=CH$_2$)—, or —N(CH$_2$—CR$^3$(=CH$_2$))—CH$_2$—C(=CH$_2$)— where $R^3$ is hydrogen or methyl, $R^2$ is hydrogen or methyl;

OA is an oxyalkylene group;

n is 2 to 100; and

X is a group comprising at least one acidic H atom, or a salt thereof.

2. An anionic surfactant according to claim 1 wherein one of R and $R^1$ is a $C_{12}$ to $C_{20}$ alkenyl group.

3. An anionic surfactant according to claim 1 where n is in the range from 5 to 30.

4. An anionic surfactant according to claim 1 wherein X comprises at least one sulphur atom.

5. An anionic surfactant according to claim 1 wherein $R^2$ is an group of formula —CH2—C(=CH2)—$R^4$ where $R^4$ is hydrogen or methyl; or a group of formula —$R^5$—O—C(O)—C(=CH$_2$)—$R^6$ where $R^5$ is hydrogen or methyl, and $R^6$ is a $C_2$ to $C_6$ linear or branched alkyl.

6. A method of free radical initiated addition polymerisation of at least one ethylenically unsaturated monomer in the presence of a surfactant comprising adding at least one anionic surfactant of the formula (I):

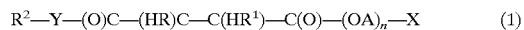

$$R^2-Y-(O)C-(HR)C-C(HR^1)-C(O)-(OA)_n-X \quad (1)$$

wherein one of R and $R^1$ is a $C_6$ to $C_{22}$ linear or branched alkyl or alkenyl, and the other is hydrogen;

Y is O, or NH, or —NH—CH$_2$—C(=CH$_2$)—, or —N(CH$_2$—CR$^3$(=CH$_2$))—CH$_2$—C(=CH$_2$)— where $R^3$ is hydrogen or methyl;

when Y is O, $R^2$ is hydrogen, or a salt, or a $C_1$ to $C_6$ linear or branched alkyl, or an optionally substituted $C_3$ to $C_{10}$ linear or branched alkenyl;

when Y is NH, or —NH—CH$_2$—C(=CH$_2$)—, or —N(CH$_2$—CR$^3$(=CH$_2$))—CH$_2$—C(=CH$_2$)— where $R^3$ is hydrogen or methyl, $R^2$ is hydrogen or methyl;

OA is an oxyalkylene group;

n is 2 to 100; and

X is a group comprising at least one acidic H atom, or a salt thereof, to a polymerization medium.

7. A method according to claim 6 wherein the ethylenically unsaturated monomer(s) is or comprises at least one vinyl monomer.

8. A method according to claim 7 wherein the vinyl monomer(s) represent at least 60% by weight of the ethylenically unsaturated monomer(s).

9. A method according to claim 6 wherein the at least one anionic surfactant of the formula (I) is used for a seed stage, and at least one non-ionic surfactant of the formula (II) below is used for a particle growth stage in emulsion polymerisation:

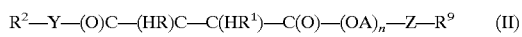

$$R^2-Y-(O)C-(HR)C-C(HR^1)-C(O)-(OA)_n-Z-R^9 \quad (II)$$

wherein R, $R^1$, $R^2$, Y, OA and n are as defined for the anionic surfactant of formula (I), and Z is O, or NH, or —NH—CH$_2$—C(=CH$_2$)—, or —N(CH$_2$—CR$^{10}$(=CH$_2$))—CH$_2$—C(=CH$_2$)— where $R^{10}$ is hydrogen or methyl;

when Z is O, $R^9$ is hydrogen, or a $C_1$ to $C_6$ linear or branched alkyl, or an optionally substituted $C_3$ to $C_{10}$ linear or branched alkenyl;

when Z is NH, or —NH—CH$_2$—C(=CH$_2$)—, or —N(CH$_2$—CR$^{10}$(=CH$_2$))—CH$_2$—C(=CH$_2$)— where $R^{10}$ is hydrogen or methyl, $R^9$ is hydrogen or methyl.

10. A process for emulsion polymerization comprising adding at least one anionic surfactant of the formula (I):

$$R^2-Y-(O)C-(HR)C-C(HR^1)-C(O)-(OA)_n-X \quad (I)$$

wherein one of R and $R^1$ is a $C_6$ to $C_{22}$ linear or branched alkyl or alkenyl, and the other is hydrogen;

Y is O, or NH, or —NH—CH$_2$—C(=CH$_2$)—, or —N(CH$_2$—CR$^3$(=CH$_2$))—CH$_2$—C(—CH$_2$)— where $R^3$ is hydrogen or methyl;

when Y is O, $R^2$ is hydrogen, or a salt, or a $C_1$ to $C_6$ linear or branched alkyl, or an optionally substituted $C_3$ to $C_{10}$ linear or branched alkenyl;

when Y is NH, or —NH—CH$_2$—C(=CH$_2$)—, or —N(CH$_2$—CR$^3$(=CH$_2$))—CH$_2$—C(=CH$_2$)— where $R^3$ is hydrogen or methyl, $R^2$ is hydrogen or methyl;

OA is an oxyalkylene group;

n is 2 to 100; and

X is a group comprising at least ones acidic H atom, or a salt thereof, to a polymerization medium.

11. An anionic surfactant according to claim 2 where n is in the range from 5 to 30.

* * * * *

UNITED STATES PATENT AND TRADEMARK OFFICE
CERTIFICATE OF CORRECTION

PATENT NO. : 6,858,573 B1
DATED : February 22, 2005
INVENTOR(S) : Johny D. Grade et al.

It is certified that error appears in the above-identified patent and that said Letters Patent is hereby corrected as shown below:

Column 10,
Lines 47-54, should read as follows:

1. An anionic surfactant of the formula (I):

$$R^2-Y-(O)C-(HR)C-C(HR^1)-C(O)-(OA)_n-X \qquad (I)$$

wherein one of R and $R^1$ is a $C_6$ to $C_{22}$ linear or branched alkyl or alkenyl, and the other is hydrogen;
Y is O, or NH, or $-NH-CH_2-C(=CH_2)-$, or $-N(CH_2-CR^3(=CH_2))-CH_2-C(=CH_2)-$ where $R^3$ is hydrogen or methyl;
when Y is O, $R^2$ is hydrogen, or a salt, or a $C_1$ to $C_6$ linear or branched alkyl, or an optionally substituted $C_3$ to $C_{10}$ linear or branched alkenyl;
when Y is NH, or $-NH-CH_2-C(=CH_2)-$, or $-N(CH_2-CR^3(=CH_2))-CH_2-C(=CH_2)-$ where $R^3$ is hydrogen or methyl, $R^2$ is hydrogen or methyl;
OA is an oxyalkylene group;
n is 2 to 100; and
X is a group comprising at least one acidic H atom, or a salt thereof.

Signed and Sealed this

Twenty-fifth Day of October, 2005

JON W. DUDAS
*Director of the United States Patent and Trademark Office*